United States Patent [19]

Hoblingre et al.

[11] Patent Number: 4,750,380
[45] Date of Patent: Jun. 14, 1988

[54] ANTI-THEFT DEVICE FOR THE STEERING COLUMN OF A MOTOR VEHICLE

[75] Inventors: Andre Hoblingre; Jean-Pierre Barnabe, both of Valentigney, France

[73] Assignee: Cycles Peugeot, Valentigney, France

[21] Appl. No.: 901,497

[22] Filed: Aug. 28, 1986

[30] Foreign Application Priority Data

Sep. 3, 1985 [FR] France ............................ 85 13085

[51] Int. Cl.$^4$ .......................... G05G 1/10; B25G 3/20; F16B 7/04
[52] U.S. Cl. ..................................... 74/556; 70/185; 403/368
[58] Field of Search .................... 403/368, 371, 374; 74/552-556; 70/185

[56] References Cited

U.S. PATENT DOCUMENTS

| | | | |
|---|---|---|---|
| 1,510,823 | 10/1924 | Betts | 70/185 |
| 1,589,169 | 6/1926 | Hugues | 70/185 |
| 1,644,922 | 10/1927 | Hershey | 70/185 |
| 1,714,426 | 5/1929 | Kuepfer | 70/185 |
| 1,752,282 | 3/1930 | Brauning | 70/185 |
| 1,838,891 | 12/1931 | van Sickel | 70/185 |
| 1,923,907 | 8/1933 | Blaschk | 70/185 |
| 2,006,104 | 6/1935 | Knapper | 70/185 |
| 2,073,217 | 3/1937 | Manton | 70/185 |
| 2,231,546 | 2/1941 | Neiman | 70/185 |
| 2,874,562 | 2/1959 | Cross | 70/185 |

FOREIGN PATENT DOCUMENTS

| | | |
|---|---|---|
| 0129522 | 12/1984 | European Pat. Off. . |
| 3439412 | 5/1986 | Fed. Rep. of Germany ........ 70/185 |
| 1240060 | 7/1960 | France ................................. 70/185 |
| 2142995 | 2/1973 | France . |
| 2161392 | 7/1973 | France . |
| 463048 | 4/1951 | Italy ..................................... 70/185 |
| 8304227 | 12/1983 | PCT Int'l Appl. . |
| 151148 | 9/1920 | United Kingdom .................. 70/185 |

Primary Examiner—Gary L. Smith
Assistant Examiner—Vinh Luong
Attorney, Agent, or Firm—Sughrue, Mion, Zinn, Macpeak, and Seas

[57] ABSTRACT

This device comprises a sleeve (31) perforated with at least one slot (20) receiving the bolt (22) of a locking mechanism integral with the vehicle body. This sleeve (31) has, at one of its ends, longitudinal slots (4) which are engaged over axial projections (6) carried by a bush (28) interposed between the sleeve (31) and the steering-wheel shaft (2), this bush being splined on the inside and thus being made integral with the shaft (2). A rotation of the steering wheel must therefore overcome a periodically variable resistant torque.

15 Claims, 3 Drawing Sheets

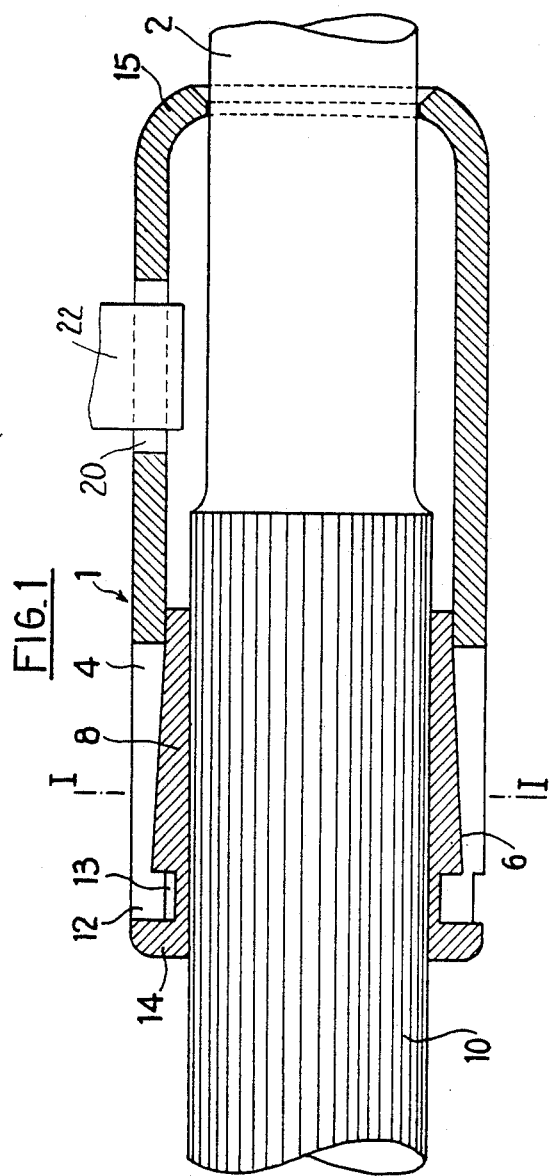
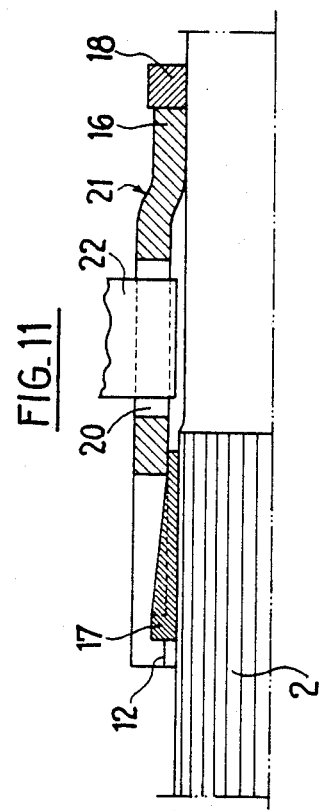
FIG. 1
FIG. 11

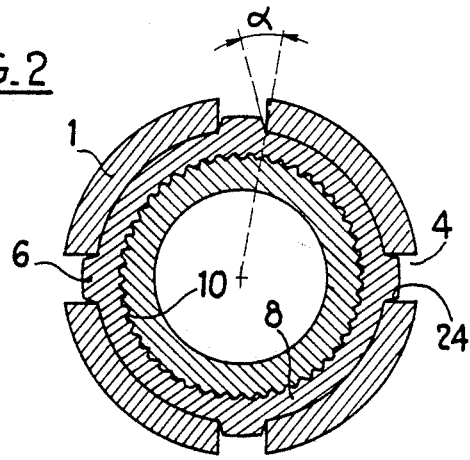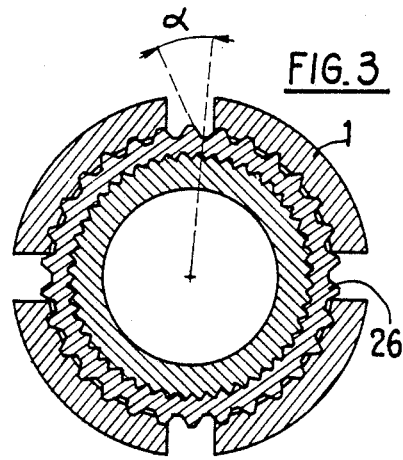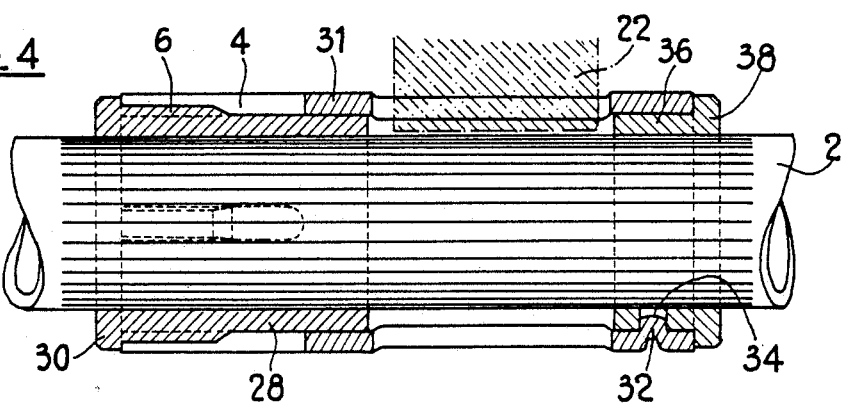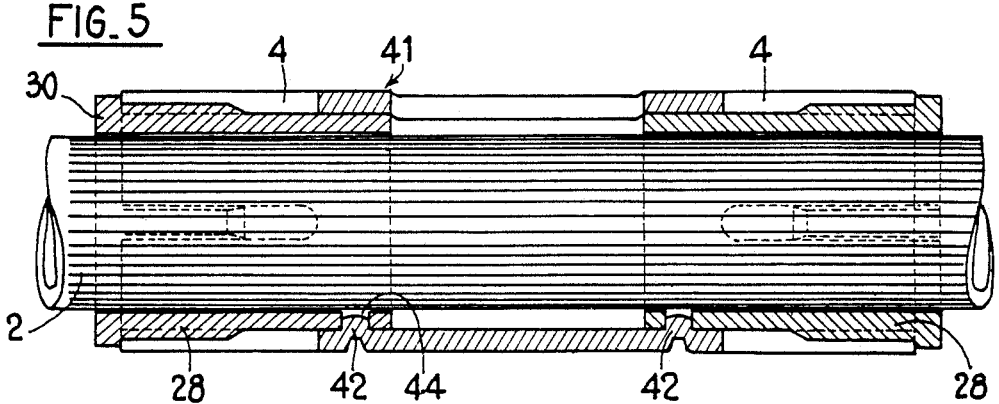

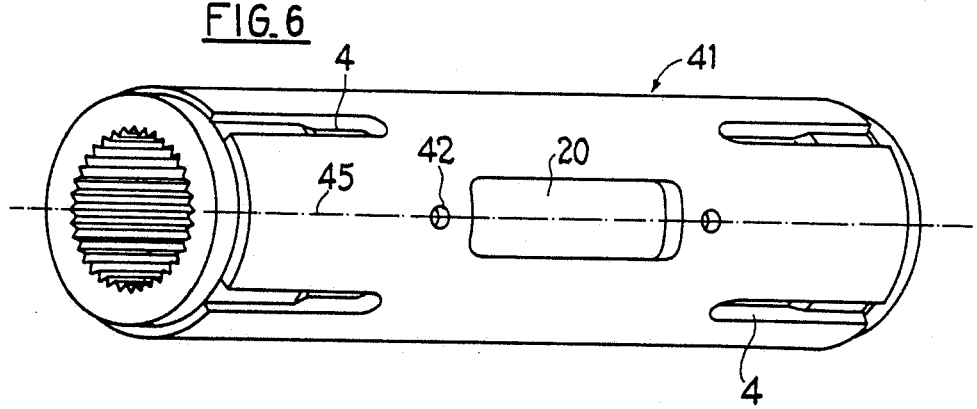
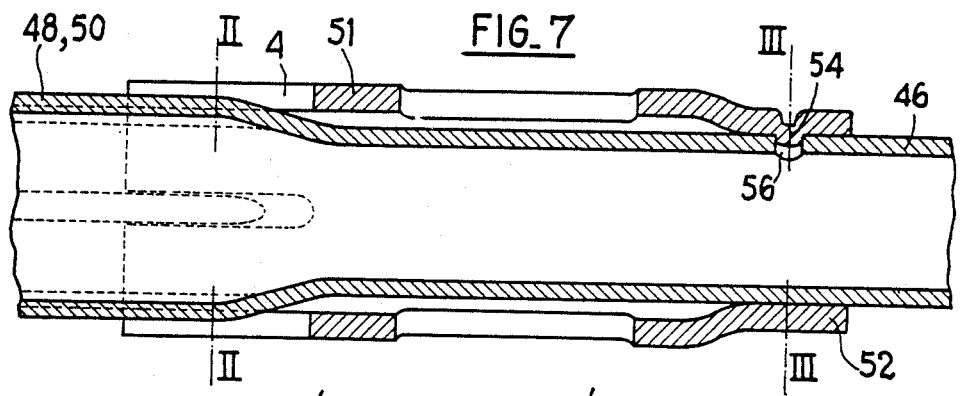
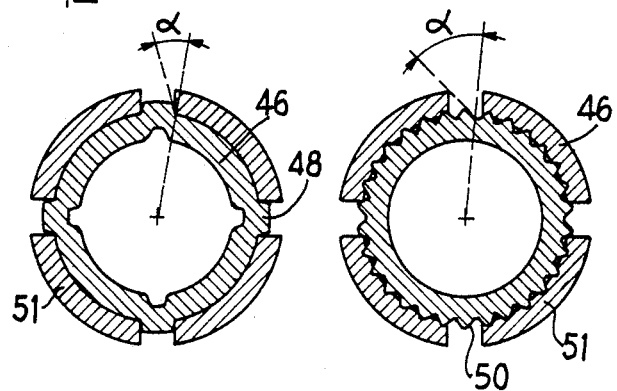
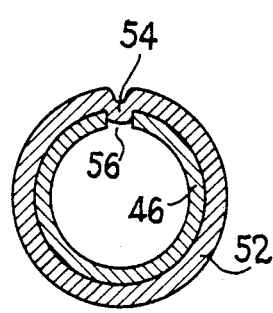

ANTI-THEFT DEVICE FOR THE STEERING COLUMN OF A MOTOR VEHICLE

Anti-theft devices for the steering columns of motor vehicles comprise, at the present time, a locking mechanism which is fastened to the vehicle body and the bolt of which fits into a slot in the casing tube of the column and into a corresponding slot in a sleeve integral with the steering-wheel shaft. These various members are thus strictly prevented from rotating, so that in an attempt at theft the force exerted by the thief tends to cause the fracture of the shaft of the steering-wheel or the casing tube of the steering column. The theft is thus prevented, but the vehicle cannot be used until its owner has replaced the steering-column assembly.

The object of the present invention is to avoid this disadvantage by providing an anti-theft device which does not cause a fracture of the steering system during an attempt at theft, but nevertheless prevents the vehicle from being driven.

In fact, the subject of this invention is an anti-theft device in which the sleeve has, at one of its ends, longitudinal slots which are uniformly spaced from one another and which are engaged over axial projections integral with the steering-wheel shaft, which are shorter than the slots in the sleeve and which narrow towards the outside.

When the column is locked, the rotation of the steering-wheel is counteracted by the contact between the projections and the slots. However, it can be achieved by exerting a sufficiently high force, but this force has to be repeated periodically, thus making it practically impossible to drive the vehicle. However, there is no risk that the column will be fractured.

According to another characteristic of the invention, the projections are carried by a bush which is splined on the inside and which is interposed between the steering-wheel shaft and the sleeve.

According to another embodiment, the projections are carried by the steering-wheel shaft itself. The sleeve can likewise have longitudinal slots at its other end, projections being provided opposite these slots.

Moreover, the following description of embodiments, given as non-limiting examples and illustrated in the attached drawings, will reveal the advantages and characteristics of the invention.

In these drawings:

FIG. 1 is a longitudinal section through an anti-theft device according to the invention;

FIG. 2 is a sectional view along the line 1—1 of FIG. 1;

FIG. 3 is a view, similar to that of FIG. 2, of an alternative embodiment;

FIG. 4 is a longitudinal section through the anti-theft device of the invention according to a second embodiment;

FIG. 5 is a view, similar to that of FIG. 4, of another alternative embodiment;

FIG. 6 is a perspective view of the anti-theft device of FIG. 5;

FIG. 7 is a longitudinal section through another alternative embodiment of the invention;

FIG. 8 is a sectional view along the line 2—2 of FIG. 7;

FIG. 9 is a view, similar to that of FIG. 8, of an alternative embodiment;

FIG. 10 is a section along the line 3—3 of FIG. 7;

FIG. 11 is a partial view, in longitudinal section, of another alternative embodiment.

The anti-theft device according to the invention comprises, inside the casing tube of the steering column, which has not been shown in order to clarify the drawings, a sleeve 1 made integral with the steering-wheel shaft 2.

The sleeve 1 has, at one of its ends, longitudinal slots 4 uniformly spaced from one another and is engaged over projections 6 formed on the outer surface of a bush 8 made integral with the steering-wheel shaft 2 by means of splines 10.

In the embodiment illustrated in FIG. 2, the projections 6 consist of four axial ribs, the radial dimension of which decreases progressively from the outer end of the bush 8 towards the closed part of the slots 4. These ribs are shorter than the corresponding slots 4 and, furthermore, their cross-sectional width narrows radially outwardly, their cross-section having, for example, a substantially trapezoidal shape.

Preferably, as shown in FIG. 1, the sleeve 1 has an inner rim 12 which fits into a groove 13 made in the bush 8 in the vicinity of an outer rim 14 of the latter, so that these two members are made integral with one another axially.

In some cases, however, the outer rim 14 of the bush can be omitted, as shown in FIG. 11. The inner rim 12 of the sleeve 21 then simply comes up against the end of greater thickness 17 of the bush.

At its end opposite the slots 4, the sleeve 21 has a part 16 of smaller diameter which is clamped on the steering-wheel shaft 2. If appropriate, a ring 18 fastened to this steering-wheel shaft immobilises the entire sleeve 1 axially in relation to this shaft.

The sleeve 1 also has at least one slot 20 allowing the passage of the bolt 22 of a locking mechanism fastened to the vehicle body, this bolt also passing through a corresponding slot in the casing tube of the steering column.

When the bolt 22 is fitted into the slot 20 in this way, a force, exerted on the steering-wheel so as to rotate it and cause a movement of the shaft 2 in terms of rotation, has to overcome the resistant torque arising as a result of the interaction of the projections or ribs 6 with the edges of the slots 4 and make it possible for the projections to push the wall of the sleeve away in order to move relative to the latter. The force to be exerted in order to achieve such a movement is therefore extremely high and can easily correspond to a value at least equal to that demanded by the safety standards.

When this torque is overcome, the projections 6 penetrate into the sleeve and slide over its inner face. The shaft 2 can rotate with a minimum resistant torque, up to the moment when the projections 6 reach the following slots and again make it necessary to exert maximum torque for rotation. This periodic variation in the torque makes it practically impossible to drive the vehicle, but does not cause any risk that the column will fracture.

The shape and, in paraticular, the cross-section of the ribs are chosen according to the maximum torque desired. For example, the flanks 24 of the ribs 6 have in relation to the radius of the bush 8 an inclination α determined according to this torque.

Of course, the number of ribs 6 and their length can vary. For example, the four ribs 6 can, as shown in FIG. 3, be replaced by a series of splines 26 which have triangular or rounded cross-sections. Like the ribs 6, these splines have a length shorter than that of the slots 4, the length of contact between the projections and the slots as well as the radial dimension of the projections being chosen according to the minimum resistant torque desired.

The splines 26, like the ribs 6, can also be formed on a bush 28, such as that shown in FIG. 4, which has an outer rim 30 which comes axially up against the sleeve and which replaces the rim 12 of the sleeve 1.

Moreover, in the embodiment illustrated in this FIG. 4, the end of the sleeve 31 opposite the slots 4 has a cylindrical shape of the same diameter as the rest of the sleeve and simply possesses one or more inner bosses 32, for example half-cut, which each penetrate into a corresponding hole 34 in a second splined bush 36 interposed in the same way as the first between the steering-wheel shaft 2 and the sleeve 31. This bush 36 preferably has a rim 38 similar to the rim 30 of the bush 28.

In this device, the boss or bosses 32 ensure that the sleeve 31 is blocked relative to the steering-wheel shaft 2 and resist any attempt to drive the sleeve 31 in rotation, as long as the force exerted does not exceed the set resistant torque. When this torque is reached, the bosses fracture, and the ribs 6 or 26, interacting with the slots 4, in turn prevent the vehicle from being driven. The device then functions in the same way as that of FIG. 1.

In other cases, to ensure additional retention, the device can comprise, as shown in FIGS. 5 and 6, a sleeve 41, the two ends of which are made in the same way and consequently there are two series of slots 4 distributed uniformly over their periphery. Two bushes 28 are then fitted to the two ends of the sleeve 41, so that two series of ribs 6 or 26 interact with the corresponding series of slots.

In the embodiment illustrated, the sleeve 41 also has at least one half-cut boss 42 on each side of the slot 20 for the passage of the catch bolt of the locking mechanism. Each of the bosses 42 is fitted into a hole 44 in the corresponding bush 24.

In the same way as the bosses 32 of FIG. 4, each of the bosses 42 of this embodiment ensures that the sleeve 41 is blocked completely relative to the steering-wheel shaft 2 and gives way in the manner of a fuse when the safety torque is reached. The subsequent rotational movement of the shaft in the sleeve 41 is then braked periodically as a result of the interaction of the slots 4 with the ribs 6 or 26 and the resistance of the portions 45 of the sleeve which separate these slots.

According to an alternative embodiment illustrated in FIGS. 6 to 10, the braking projections of the sleeve are formed directly in the wall of a steering-wheel shaft 46 produced by means of a hollow tube. These projections can consist either, as shown in FIG. 8, of ribs 48 similar to the ribs 6 of FIG. 2, obtained, for example, as a result of the deformation of the wall of the tube, or, as shown in FIG. 9, of splines 50 similar to the splines 26 and having triangular or rounded cross-sections. At all events, the projections 48, 50 interact with the slots 4 of a sleeve 51 fitted round the shaft 46, but do not extend over the entire length of these slots and have a progressively decreasing radial thickness. At its end opposite the slots 4, the sleve 51 is extended in the form of a portion of smaller diameter 52 which is preferably provided with a half-cut inner boss 54 penetrating into a hole 56 in the wall of the tube 46.

The sleeve 51 is thus strictly integral with the steering-wheel shaft 46, so that it is impossible for anyone to rotate the steering-wheel shaft 46 when this sleeve is retained by the bolt 22 of the anti-theft locking mechanism of the vehicle. However, when the force exerted on the steering-wheel 46 reaches too high a value, the boss 54 gives way in the same way as the bosses 32 or 42 and makes it possible to move the steering-wheel against the combined action of the ribs 48 or 50 and slots 4. It is nevertheless impossible to drive the vehicle in the normal way, since the force to be exerted in order to rotate the steering-wheel varies periodically between values which differ greatly from one another.

The anti-theft device thus gives the owner of the vehicle a considerable degree of safety, without the risk of fracture of either the steering-wheel shaft or the casing tube of the steering column, with the result that the vehicle can be used normally again even after an attempt at theft.

Of course, modifications can be made to the embodiments just described. For example, the sleeve 1, 31 or 51 could have two identical split ends and interact with two similar bushes 8 or 28 or with two splined portions of the shaft. In the same way, the sleeve 51, like the sleeve 1, could be without a boss 54, its end of small diameter 52 simply coming up against the shaft 46.

We claim:

1. Anti-theft device for a steering column of a vehicle, said device comprising a steering wheel shaft, a sleeve coaxially surrounding said shaft and defining first slot means for receiving a steering shaft-locking bolt of a lock mechanism, and second slot means, means defining projections which are connected to rotate with said shaft, said projections being circumferentially spaced apart on said shaft and extending axially of said shaft, said second slot means comprising slots in said sleeve adjacent an end of said sleeve, at least some of which slots are throughway slots in said sleeve and are longer than said projections, said projections having a cross-sectional shape which tapers radially outwardly of said shaft and extending into said slots for preventing relative rotation between said shaft and said sleeve up to a predetermined given torque, said sleeve having such strength that beyond said given torque said projections deform said sleeve and become circumferentially disengaged from said slots and allow relative rotation between said shaft and said sleeve.

2. Device according to claim 1, wherein said shaft has outer splines and said means defining said projections comprise a bush coaxially surrounding said shaft and having inner splines engaged with said outer splines.

3. Device according to claim 1 wherein said projections are formed on said shaft.

4. Device according to claim 1, wherein said projections are defined by outer splines having a substantially triangular cross-sectional shape.

5. Device according to claim 1, wherein said sleeve is extended, at an end opposite said end adjacent to which said slots are provided, by a portion of smaller diameter in contact with said shaft.

6. Device according to claim 1, wherein said slots are provided adjacent to both ends of said sleeve, into which slots two series of said projections extend.

7. Device according to claim 6, wherein said shaft has two series of outer splines in confronting relation to opposite end portions of said sleeve and said means defining said projections comprise two bushes coaxially surrounding said shaft and having inner splines engaged with said two series of outer splines of said shaft.

8. Device according to claim 1, comprising at least one inner boss on said sleeve and means defining a respective aperture connected to rotate with said shaft in which aperture said boss is engaged.

9. Device according to claim 8, wherein said shaft defines said aperture.

10. Device according to claim 2, wherein said bush has an outer rim in axial abutting relation to said sleeve.

11. Device according to claim 2, wherein said sleeve has an inner rim in axial abutting relation to said bush.

12. Device according to claim 1, wherein said throughway slots extend from an end of said sleeve and constitute open-ended slots.

13. Device according to claim 1, wherein said projections have a tapering shape in radial planes of said shaft in at least a part of the length of the projections, which part of said projections is an innermost part of said projections relative to said sleeve.

14. Anti-theft device for a steering column of a vehicle, said device comprising a steering wheel shaft, a sleeve coaxially surrounding said shaft and defining first slot means for receiving a steering shaft-locking bolt of a lock mechanism, and second slot means, means defining projections which are connected to rotate with said shaft, said projections being circumferentially spaced apart on said shaft and extending axially of said shaft, said second slot means comprising slots in said sleeve adjacent an end of said sleeve, at least some of which slots are throughway slots in said sleeve and are longer than said projections, said projections having a cross-sectional shape which tapers radially outwardly of said shaft and extending into said slots for preventing relative rotation between said shaft and said sleeve up to a predetermined given torque, said sleeve having such strength that beyond said given torque said projections deform said sleeve and become circumferentially disengaged from said slots and allow relative rotation between said shaft and said sleeve, said projections comprising ribs engaged in respective slots of said slots.

15. Anti-theft device for a steering column of a vehicle, said device comprising steering wheel shaft, a sleeve coaxially surrounding said shaft and defining first slot means for receiving a steering shaft-locking bolt of a lock mechanism, and second slot means, means defining projections which are connected to rotate with said shaft, said projections being circumferentially spaced apart on said shaft and extending axially of said shaft, said second slot means comprising slots in said sleeve adjacent an end of said sleeve, at least some of which slots are throughway slots in said sleeve and are longer than said projections, said projections having a cross-sectional shape which tapers radially outwardly of said shaft and extending into said slots for preventing relative rotation between said shaft and said sleeve up to a predetermined given torque, sleeve having such strength that beyond said given torque said projections deform said sleeve and become circumferentially disengaged from said slots and allow relative rotation between said shaft and said sleeve, said device further comprising at least one inner boss on said sleeve and an aperture defined by said shaft, into which aperture said boss radially extends for preventing relative rotation between said shaft and said sleeve up to said predetermined torque.

* * * * *